US008144607B2

(12) United States Patent
Hauenstein et al.

(10) Patent No.: US 8,144,607 B2
(45) Date of Patent: Mar. 27, 2012

(54) LOCATION-BASED ADDRESS RESOLUTION

(75) Inventors: Markus Hauenstein, Dusseldorf (DE);
Christoph Delfs, Dusseldorf (DE);
Jurgen Opschroef, Straelen (DE);
Torsten Musiol, Ratingen (DE);
Stephan Grunloh, Osnabruck (DE);
Uwe Kretschmer, Willich (DE)

(73) Assignee: Nokia Corporation, Espoo (FI)

( * ) Notice: Subject to any disclaimer, the term of this patent is extended or adjusted under 35 U.S.C. 154(b) by 1197 days.

(21) Appl. No.: 11/634,944

(22) Filed: Dec. 7, 2006

(65) Prior Publication Data

US 2008/0137547 A1      Jun. 12, 2008

(51) Int. Cl.
*H04L 12/26* (2006.01)
(52) U.S. Cl. .............. 370/252; 455/404.2; 455/456.1; 455/561
(58) Field of Classification Search ............. 370/252; 340/825.49; 455/404.2, 456.1, 561
See application file for complete search history.

(56) References Cited

U.S. PATENT DOCUMENTS

| 6,426,959 | B1* | 7/2002 | Jacobson et al. ............. 370/468 |
| 2002/0068559 | A1* | 6/2002 | Sharma et al. ............. 455/423 |
| 2003/0095520 | A1* | 5/2003 | Aalbers et al. ............. 370/338 |
| 2005/0030194 | A1* | 2/2005 | Cheng et al. ............. 340/825.49 |
| 2005/0192678 | A1* | 9/2005 | May et al. ............. 700/9 |
| 2006/0079999 | A1* | 4/2006 | Husein ............. 700/275 |
| 2007/0143013 | A1* | 6/2007 | Breen ............. 701/211 |
| 2007/0176771 | A1* | 8/2007 | Doyle ............. 340/539.13 |
| 2008/0200143 | A1* | 8/2008 | Qiu et al. ............. 455/404.2 |

FOREIGN PATENT DOCUMENTS

WO      WO 03/045037      5/2003

* cited by examiner

*Primary Examiner* — Luat Phung
(74) *Attorney, Agent, or Firm* — Harrington & Smith (57) ABSTRACT

The present invention relates to a method that provides for advertising a network node to a managing node in a communication network. To this end, at the network node, position data of the network node are determined. At the managing node, at least one condition to be satisfied by the network node is set and a request message containing the at least one condition is transmitted by the managing node. Then, the request message containing the at least one condition is received at the network node and the at least one condition is evaluated at the network node. In case a specified combination of conditions is satisfied, the network node replies with a reply message containing at least a network protocol address and the determined position data of the network node. The present invention further relates to a corresponding system and network entities involved.

35 Claims, 4 Drawing Sheets

Fig. 4

LOCATION-BASED ADDRESS RESOLUTION

FIELD OF THE INVENTION

The present invention relates to the field of network management and in particular to automatic commissioning and configuring of newly installed or existing network nodes from a remote location. In this regard, the present invention relates to a corresponding method, system, and network entities involved.

BACKGROUND

For the purpose of the present invention to be described herein below, it should be noted that

- a network node/managing node may for example be any kind of communication station, such as wireless or wired stations, e.g. base stations, base transceiver stations, personal computers, or the like, irrespective of a specific standard to which these conform as long as they are compatible with the communication network, such as Global System for Mobile Communication (GSM), Universal Mobile Telecommunication System (UMTS), IS-95, Worldwide Interoperability for Microwave Access (WiMAX) or the like;
- for the communication network any suitable protocol for operating/message exchange is possible; only as an example it is noted that IP (internet protocol) based networks are particularly suitable to be used with the present invention;
- method steps or actions performed in connection with the method, likely to be implemented as software code portions and being run using a processor at one of the network node/managing node entities, are software code independent and can be specified using any known or future developed programming language as long as the functionality defined by the method steps or actions is preserved;
- generally, any method step is suitable to be implemented as software or by hardware without changing the idea of the present invention in terms of the functionality implemented;
- method steps and/or devices likely to be implemented as hardware components at one of the network node/managing node entities are hardware independent and can be implemented using any known or future developed hardware technology or any hybrids of these, such as MOS (Metal Oxide Semiconductor), CMOS (Complementary MOS), BiCMOS (Bipolar CMOS), ECL (Emitter Coupled Logic), TTL (Transistor Transistor Logic), etc., using for example ASIC (Application Specific Integrated Circuit) components or DSP (Digital Signal Processor) components, as an example;
- devices can be implemented as individual devices, but this does not exclude that they are implemented in a distributed fashion throughout the system, as long as the functionality of the device/system is preserved;
- respective elements, e.g. transceiver, generator, setting unit etc. according to embodiments can be implemented by any known means, either in hardware (e.g. using DSP, microprocessor, microcontroller, ASIC, field programmable gate array (FPGA), AD- and DA-converters, power amplifiers, filters, antennas etc) and/or software, respectively, as long as it is adapted to perform the described functions of the respective parts.

Due to an increasing data load that is communicated in communication networks and/or an increasing number of subscribers in a communication network, it is sometimes necessary to add new network nodes to an existing communication network in order to be able to handle the data load and to serve all subscribers. After the mechanical installation of a new network node, like e.g. a base station, a site visit of skilled personnel is needed to commission the base station. A network node is considered to be commissioned if the network node has been configured initially to perform according to its required operation in the network. For remote commissioning a network protocol address must be allocated to the network node, so that the network node can be directly addressed by the managing node by means of the allocated network protocol address. In order to be able to address the network node, the managing node must know the network protocol address of the network node. This is called advertising a new network node to the managing node and can be done for example by setting the known network protocol address of the new network node to the managing node. In other words, a network node is considered to be advertised to the managing node when the managing node is aware about the network protocol address of the network node, has created a binding between the network protocol address and the network node and can thereafter address the network node via this network protocol address. Zone Name: A1,AMD According to a known method, network protocol addresses of network nodes are planned in advance and then set to the managing node (e.g. manually or by importing of network planning data) and to the network node. Setting the network protocol address to the network node must be done during a site visit locally (usually together with other configuration parameters). However, such site visits require highly skilled personnel and are time consuming, therefore expensive for the network operator.

According to a known method, network protocol addresses of network nodes are planned in advance and then set to the managing node (e.g. manually or by importing of network planning data) and to the network node. Setting the network protocol address to the network node must be done during a site visit locally (usually together with other configuration parameters). However, such site visits require highly skilled personal and are time consuming, therefore expensive for the network operator.

Currently, there exist several general mechanisms how to enable a network node, like e.g. the base station, to get a network protocol address (e.g. IP address) automatically, like for example the dynamic host configuration protocol (DHCP). However, although a network node can get a network protocol address automatically, the managing node is still not aware about the network protocol address and the position of the network node where it belongs to and can not address the network node directly by its network protocol address.

The same applies also to newly rolled-out networks.

SUMMARY

Accordingly, it is an object of the present invention, to provide a method and corresponding entities for advertising a network node to a managing node to allow remote commissioning/configuration of a network node within a network to overcome the above described drawbacks.

According to an aspect of the present invention, this object is, for example, achieved by a method, comprising: providing for advertising a network node to a managing node in a communication network; determining, at the network node, position data of the network node; setting, at the managing node, at least one condition to be satisfied by the network node; transmitting, by the managing node, a request message containing the at least one condition; receiving, at the network node, the request message containing the at least one condition; evaluating, at the network node, the at least one condition contained in the request message; and if a specified combination of conditions is satisfied, replying, at the network node, with a reply message containing at least a network protocol address and the determined position data of the network node.

According to advantageous further refinements of the invention as defined under the above aspect the method further comprises receiving, at the managing node, the reply message;

the method further comprises storing, at the managing node, at least the network protocol address and position data of the network node contained in the reply message;

the setting further comprises defining a condition that the network node is located within a certain area;

the setting comprises defining a condition that the network node is not yet commissioned;

the setting comprises determining the certain area, in which the network node is located, based on information related to the position of the network node that is stored in a memory of the managing node;

the transmitting comprises broadcasting the request message to all network nodes that are to be managed by the managing node;

the receiving at the managing node further comprises creating a list of not yet commissioned network nodes, identified by their network protocol address and position data, upon receipt of reply messages from more than one network node;

the method further comprising downloading configuration files from the managing node to the network nodes after receiving the reply message from the network nodes at the managing node;

the downloading to the network node is effected based on the received network protocol address of the network node;

the method further comprises acquiring, at the network node, the network protocol address for the network node;

the network protocol address is an internet protocol address;

the acquiring comprises obtaining the network protocol address by means of one of a dynamic host configuration protocol DHCP, IPv6 stateless autoconfiguration protocol or IP zero-configuration protocol;

the determining of the position data of the network node is made by means of a positioning system;

the positioning system is a satellite-based positioning system;

the transmitting and replying is effected on a lower layer of communication layers and wherein the network protocol address is used for communications on a higher layer of the communication layers;

the transmitting and replying is effected on the same layer of communication layers to which the network protocol address belongs, and the transmitting is based on a multicast scheme.

According to an aspect of the present invention, this object is, for example, further achieved by a network node, comprising: a determining unit configured to determine position data of the network node; a transceiver configured to receive a request message from a managing node containing at least one condition set by the managing node; an evaluating unit configured to evaluate the at least one condition set in the request message from the managing node; a reply unit configured to reply to the managing node with a reply message containing at least a network protocol address and position data of the network node, the transceiver being further configured to transmit the reply message to the managing node.

According to advantageous further refinements of the invention as defined under the above aspect the evaluating unit is further configured to evaluate whether the determined position is located within a certain area defined in the received request message;

the evaluating unit is further configured to evaluate whether the network node is commissioned;

the evaluating unit is further configured to evaluate whether the network node is commissioned by means of a flag, wherein the flag is set to a predetermined value and the flag is set to a value different from the predetermined value after the network node has been commissioned;

the determining unit is a receiver of a positioning system.

According to an aspect of the present invention, this object is, for example, further achieved by a managing node comprising: a setting unit configured to set at least one condition to be satisfied by a network node; a generating unit configured to generate a request message containing the at least one condition; a transceiver configured to transmit the request message containing the at least one condition to a network node, the transceiver being further configured to receive a reply message from the network node.

According to advantageous further refinements of the invention as defined under the above aspect the managing node further comprises a memory configured to store the network protocol address and position data of the network node;

the setting unit is further configured to define a condition that the network node is located within a certain area;

the setting unit is further configured to define a condition that the network node is not yet commissioned;

the memory is further configured to store in advance position data of the network node;

the memory is further configured to store in advance configuration files;

the managing node is further configured to automatically download the configuration files to the network elements after receiving the reply message from the network element;

the managing node further comprises input devices configured to input instructions from a network operator and a display configured to display the position data and network protocol address received from the network node and other data stored in the memory.

According to an aspect of the present invention, this object is, for example, further achieved by a system, comprising: a determining unit, at the network node, configured to determine position data of the network node; a setting unit, at a managing node, configured to set at least one condition to be satisfied by a network node; a generating unit, at the managing node, configured to generate a request message containing the at least one condition; a transceiver, at the managing node, configured to transmit the request message containing the at least one condition to a network node; a transceiver, at the network node, configured to receive a request message from a managing node containing at least one condition set by the managing node; an evaluating unit, at the network node, configured to evaluate the at least one condition set in the request message from the managing node; a reply unit, at the network node, configured to reply to the managing node with a reply message containing at least a network protocol address and position data of the network node; the transceiver, at the network node, being further configured to transmit the reply message to the managing node; and the transceiver, at the managing node, being further configured to receive the reply message from the network node.

According to advantageous further refinements of the invention as defined under the above aspect the system further comprises an acquiring unit, at the network node, configured to acquire a network protocol address;

the system further comprises a memory, at the managing node, configured to store the network protocol address and position data of the network node.

According to an aspect of the present invention, this object is, for example, further achieved by a computer program product, configured for a client-server computer system and comprising processor implementable instructions stored as software code portions on a computer-readable medium loadable into an internal memory of the client-server computer, comprising: providing for advertising a network node to a managing node in a communication network; determining, at the network node, position data of the network node; setting, at the managing node, at least one condition to be satisfied by the network node; transmitting, by the managing node, a request message containing the at least one condition; receiving, at the network node, the request message containing the at least one condition; evaluating, at the network node, the at least one condition contained in the request message; and if a specified combination of conditions is satisfied, replying, at the network node, with a reply message containing at least a network protocol address and the determined position data of the network node.

According to at least one embodiment of the present invention, after the installation of one or more new network nodes or for the reconfiguration of one or more existing network nodes, less site visits by highly skilled personal are needed since commissioning of the network nodes can be done remotely. As a further or alternative advantage, the network node, like e.g. a base station, does not need to be pre-configured with site-specific information before it is installed.

BRIEF DESCRIPTION OF THE DRAWINGS

At least some exemplary embodiments of the present invention are described herein below by way of example with reference to the accompanying drawings, wherein.

DETAILED DESCRIPTION OF EMBODIMENTS

The invention will be described herein below with reference to the accompanying drawings.

In the following description, the term "new network node" does not only refer to network nodes that have not been present before in the network and have to be commissioned but also to network nodes that have to be re-installed or re-configured, e.g. after upgrading the network node or the like. Thus, a new network node refers to all nodes that require a network protocol address to be assigned in order to be able to communicate data.

In the figures, individual steps can be merged to be executed simultaneously, or partitioned to sub-steps to be executed sequentially, without essentially modifying the substance of the invention.

Figure 1:
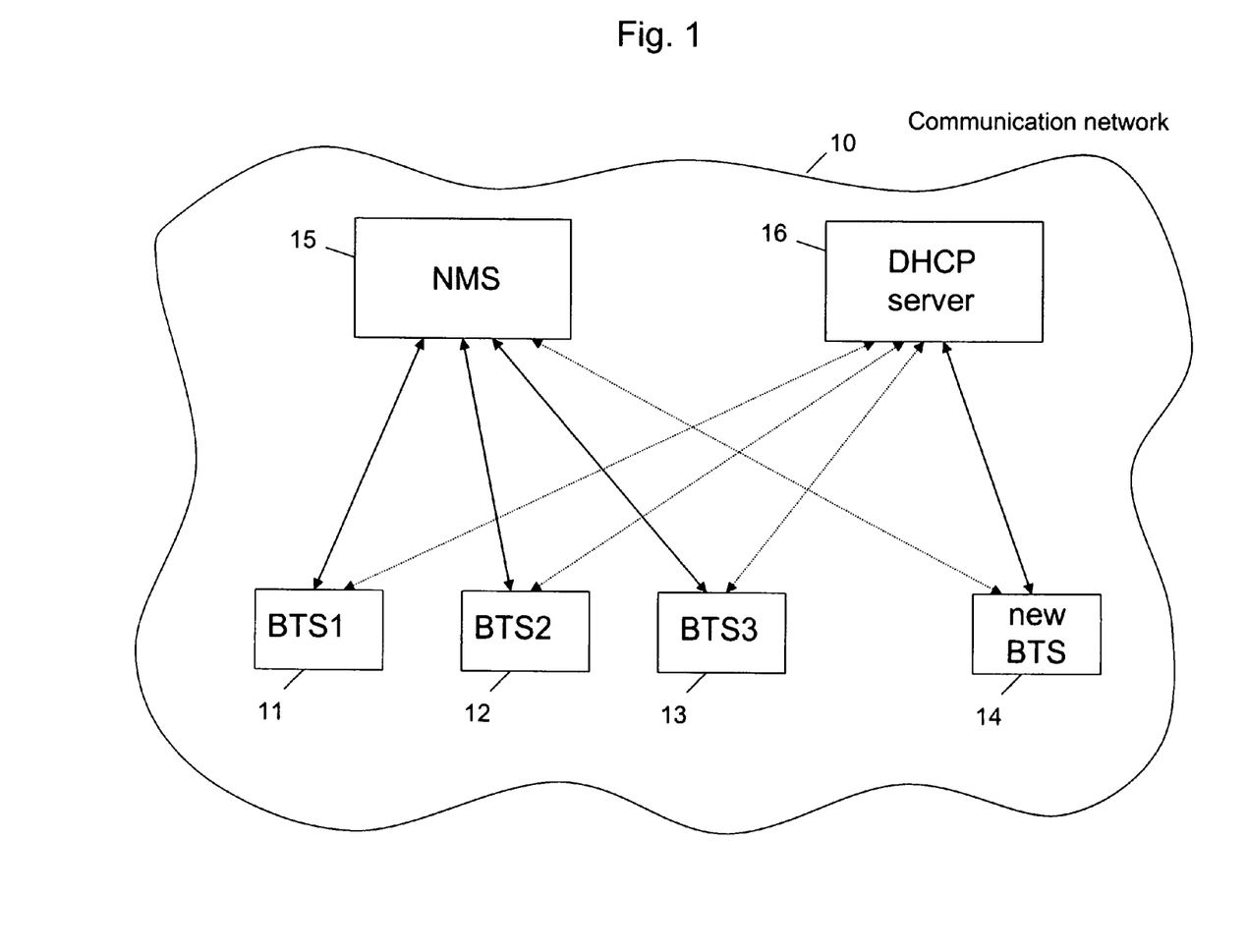
FIG. 1 is a basic overview of a communication network to which the embodiments of the present invention are applicable.

FIG. 1 shows a basic overview of a communication network according to an embodiment of the present invention. A communication network 10 to which the present invention is applicable comprises a plurality of network nodes 11, 12 and 13, like e.g. base transceiver stations, base stations or the like, which are already commissioned and can be directly addressed by the managing node based on the respective network protocol addresses. The communication network 10 further comprises a new network node 14 which has not been commissioned yet. The network node 14 does not have a network protocol address and is therefore not able to communicate with the managing node 15 via e.g. a layer 3 protocol, i.e. can not be directly addressed by the managing node based on a network protocol address at present. The communication network further comprises a managing node 15, like e.g. a network management system NMS or the like, which is operable to manage the network nodes 11 to 14. Furthermore, the network comprises an address allocation server 16, which is capable to allocate network protocol addresses to the network nodes 11 to 14. The address allocation server 16 may for example be a DHCP server that allocates an IP address to a network node. However, also other mechanisms like e.g. IPv6 stateless autoconfiguration protocol or zero-configuration protocol may be used as the address allocation server. As a matter of clarity, only four network nodes 11 to 14 and only one managing node 15 are shown in FIG. 1. However, the number of network nodes and managing nodes is not limited to any specific number. Generally, the number of network nodes is significantly higher than the number of managing nodes. The network nodes and the managing nodes can be connected to the communication network either wireless or wirebound.

As described already before, the new network node 14 has not been commissioned yet and is not able to communicate with the managing node based on a network protocol address. Thus, in order to be able to communicate with the managing node based on a network protocol address, a network protocol address has to be allocated to the network node 14 and the network node 14 has to be advertised to the managing node. In order to perform remote commissioning the managing node 15 needs to know further the position of the new network node to identify the corresponding commissioning data to be downloaded, which is network node specific.

According to an exemplary embodiment, this is accomplished by interacting with the address allocation server and the managing node as described below with reference to FIG. 2.

Figure 2:
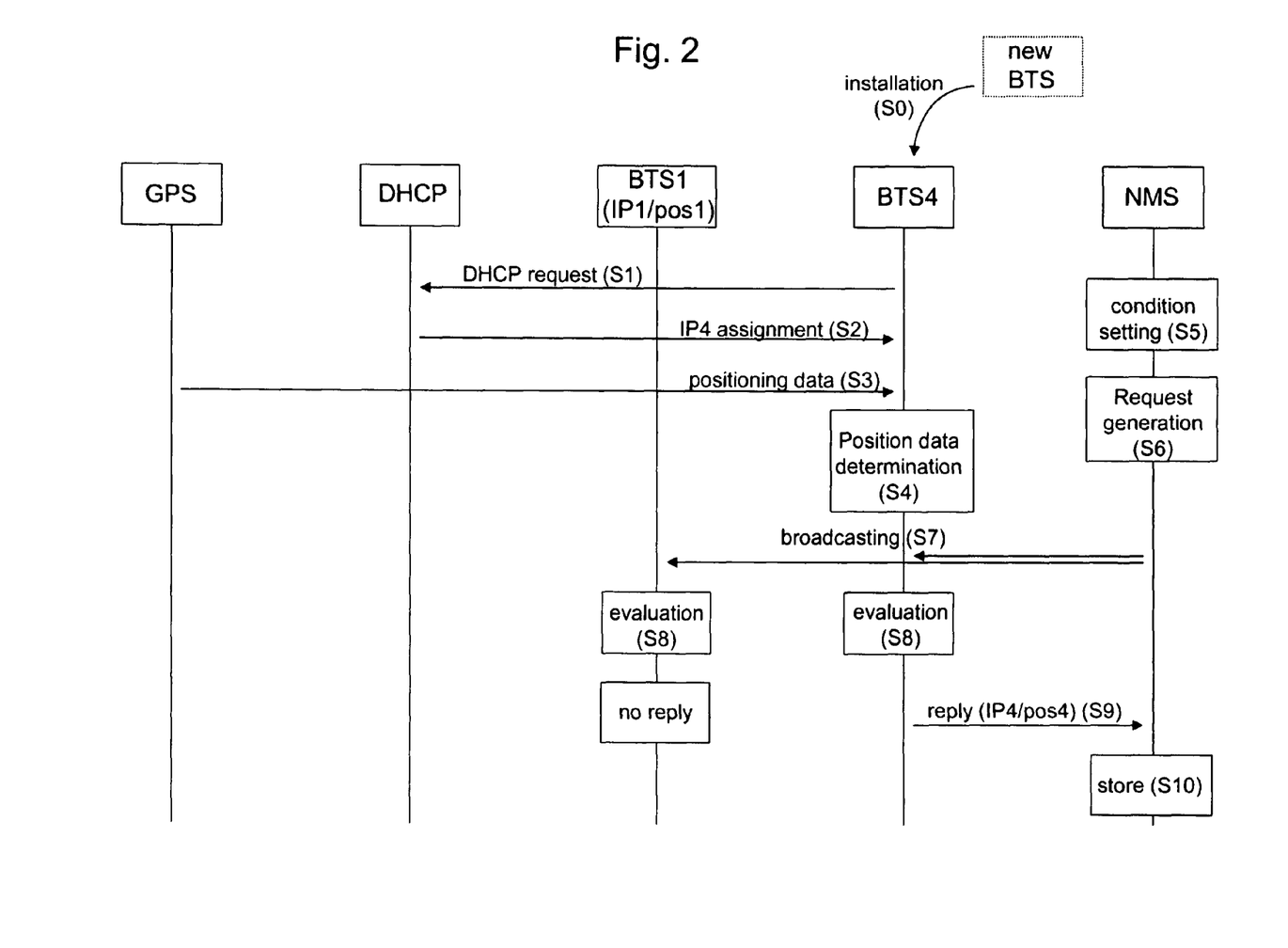
FIG. 2 is a signaling diagram illustrating the communication setup process between a network management system and a new network node according to an embodiment of the present invention.

FIG. 2 is a signaling diagram illustrating the communication setup process between the network management system NMS and the new network node BTS4 according to an embodiment of the present invention. After the mechanical installation of a network node, like e.g. BTS4, at step S0, the network node requests at step S1 a network protocol address, like e.g. an IP address. This can be done for example by means of a dynamic host configuration protocol (DHCP) from a DHCP server. Then, the DHCP server allocates at step S2 a network protocol address to the network node BTS4. However, according to modifications of the embodiment illustrated also other mechanisms could be used for acquiring a network protocol address such as IPv6 stateless autoconfiguration protocol, IP zero-configuration protocol or the like. At step S3, the network node receives positioning data from a positioning system. Then, at step S4, the network node determines its own position data from the received positioning data. For example, the position data can be in the format of coordinates like longitude and latitude and can be determined by means of a positioning system using mechanisms like e.g. triangulation. The positioning system can further be a satellite-based positioning system such as e.g. the global positioning system (GPS), Galileo or the like. As a modification, in case a different positioning system is used, the network node can be configured to request positioning data from a positioning system in order to determine its own position data.

Although the new network node BTS4 has acquired a network protocol address as described above, the managing node is not aware about the acquired network protocol address of the network node BTS4, i.e. can not directly address the network node by its network protocol address. Thus, in order to enable the network node BTS4 for communication with the managing node based on the network protocol address, the managing node needs to know the network protocol address of the newly installed network node BTS4. Therefore, in step S5, a network operator sets, at the managing node, at least one condition to be satisfied by the network nodes. An example for such a condition can be that the network node is not yet commissioned and/or that it is located within a certain area. It is noted that, if more than one condition is set, it could be required that the network node has to fulfill only one of the conditions, only some of the conditions or all of the conditions. That is, the conditions can be logically combined by, for example, AND functions, OR functions, NAND functions, NOR functions, XOR functions, or any appropriate combination of these functions. Thus, the managing node generates a request message at step S6 and broadcasts the request message containing the at least one condition at step S7 to the network nodes that are located within the area to be managed by the managing node. The broadcast of the request message can be effected either at certain time intervals, e.g. once a day, once a week or the like, or can be instructed by the network operator. At step S8, all network nodes that are located within the area to be managed by the managing node receive the request message and evaluate the at least one condition set by the network operator at the managing node and contained in the request message. At step S8, the network node evaluates if it satisfies a specified combination of conditions, e.g. is located within a certain area and/or is not commissioned yet. The evaluation whether the network node is located within a certain area can be done by comparing the coordinates obtained by the network node itself from the positioning system and the coordinates contained in the request message from the managing node. The evaluation whether the network node is not yet commissioned can be done for example by means of a flag in the network node. Initially (e.g. as factory default setting) a predetermined value is assigned to the flag. After the commissioning has been completed, the value of the flag will be changed. Thus, the network node can evaluate whether it is commissioned or not by analysing the value of the flag. In case the network node evaluates at step S8 that it satisfies a specified combination of conditions, the network node generates a reply message and transmits the reply message at step S9 to the managing node. The reply message contains at least the network protocol address and the position data of the network node BTS4 that satisfies a specified combination of conditions contained in the broadcasted request message. The managing node receives the reply message containing the network protocol address and the position data of the respective network node BTS4 and stores these data in a memory at step S10. In this example, the network node BTS1 is already commissioned and therefore does not satisfy the specified combination of conditions set in the request message. Thus, the network node BTS1 will not reply to the request message. Now, the managing node knows the network protocol address and location of all network nodes located within the area to be managed by itself and thus, all respective network nodes can be remotely commissioned.

The selection of the configuration file for remote commissioning to be downloaded to the BTS4 is based on the received position data from the BTS4. The configuration file includes settings for base station BTS4. Downloading of the configuration file (not shown in FIG. 2) from the managing node to the network node may then be effected based on the received network protocol address. Thus, with respect to the Open Systems Interconnection (OSI) Reference Model, the transmitting and replying is effected on a lower layer of communication layers, e.g. layer 2, and the network protocol address is used for communications on a higher layer of the communication layers, e.g. layer 3. However, the present invention is not limited to the use of a combination of layer 2 and layer 3, but also different combinations of layers could be used. According to another embodiment of the present invention, the transmitting and replying in connection with advertising a network node to a managing node is effected on the same layer to which the network protocol address belongs, e.g. layer 3. That is, the transmitting of the request message from the managing node to the network node is effected according to a multicast scheme (e.g. a layer 3 multicast scheme) and the replying from the network node to the managing node is effected based on the network protocol address of the managing node that has transmitted the request message. To this end, each network node then has a multicast address configured so that a managing node can address those new network nodes belonging to such a multicast group.

In the following, the network node and the managing node of the communication network according to an embodiment of the present invention will be described in detail with reference to the drawings.

Figure 3:
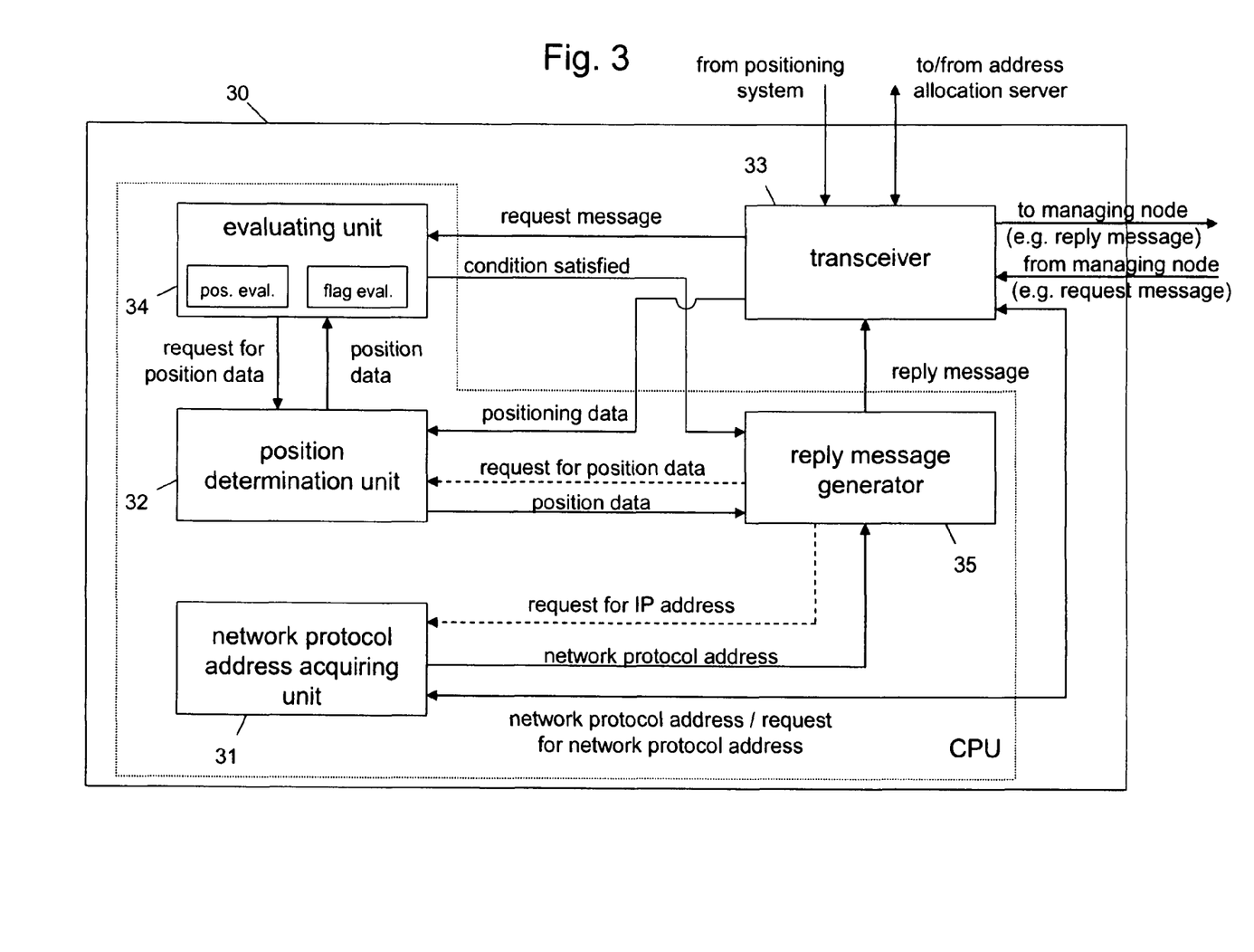
FIG. 3 is a block diagram of a network node according to an embodiment of the present invention.

FIG. 3 is a block diagram of a network node according to an embodiment of the present invention.

The network node 30, like e.g. a base station or the like comprises a network protocol address acquiring unit 31 capable of acquiring a network protocol address for the network node by means of e.g. DHCP, IPv6 stateless autoconfiguration protocol, IP zero-configuration protocol or the like. The acquiring unit 31 send a request for a network protocol address, e.g. an IP address, via a transceiver 33 that is connected to the acquiring unit 31 to an address allocation server (not shown). Then, the address allocation server sends the network protocol address via the transceiver 33 to the acquiring unit 31. The network node further comprises a position data determination unit 32 which is also connected to the transceiver 33. The position data determination unit 32 is capable of receiving positioning data from a positioning system (not shown) via the transceiver 33. Then, the position determination unit 32 determines the position data of the network node from the received positioning data. As a specific example only, the position data determination unit may be a GPS receiver capable of receiving position data from a GPS satellite. However, the position data determination unit 32 may also be realized in connection with other satellite-based positioning systems such as Galileo or the like or other positioning systems utilizing mechanisms, like for example triangulation. Via the transceiver 33, the network node 30 is further capable of receiving messages like e.g. a request message from a managing node and also capable of transmitting messages like e.g. a reply message to the managing node. Further, via the transceiver 33 the network node 30 is capable of communicating data with other network elements, like e.g. a mobile switching center, a radio network controller, mobile station or the like, which is not explicitly shown. The transceiver 33 is connected to an evaluating unit 34 and forwards a request message received from a managing node to the evaluating unit 34. The evaluating unit 34 is connected to the position determination unit 32 and obtains position data from the position determination unit 32 after sending a request for the position data. Then, as described above, the evaluating unit 34 evaluates if a specified combination of conditions contained in the request message applies to the network node. That is, the evaluating unit uses the position data to evaluate whether the network node is located with the certain area as defined in the request message and analyses the flag in the network node to evaluate whether the network node is not commissioned. In case the network node satisfies a specified combination of conditions contained in the request message, the evaluating unit 34 informs a reply message generator 35 connected thereto. The reply message generator 35 is adapted to generate a reply message containing the position data and the network protocol address to be transmitted to the managing node. The reply message generator obtains the position data and the network protocol address from the position determination unit 32 and the network protocol address acquiring unit 31, respectively, which are connected to the reply message generator 35. The position determination unit 32 and the acquiring unit 31 can either transmit the position data and the IP address at predetermined intervals to the reply message generator 35, or they may transmit the data only after receiving a request therefor from the reply message generator 35. The reply message generator 35 is further connected to the transceiver 33 and forwards the generated reply message containing the position data and the network protocol address to the transceiver 33 which in turn transmits the reply message to the managing node.

The processing of all components comprised in the network node is either controlled by a central processing unit (CPU) or by separate processing units, respectively, e.g. DSPs or the like, that are not shown in FIG. 3.

Figure 4:
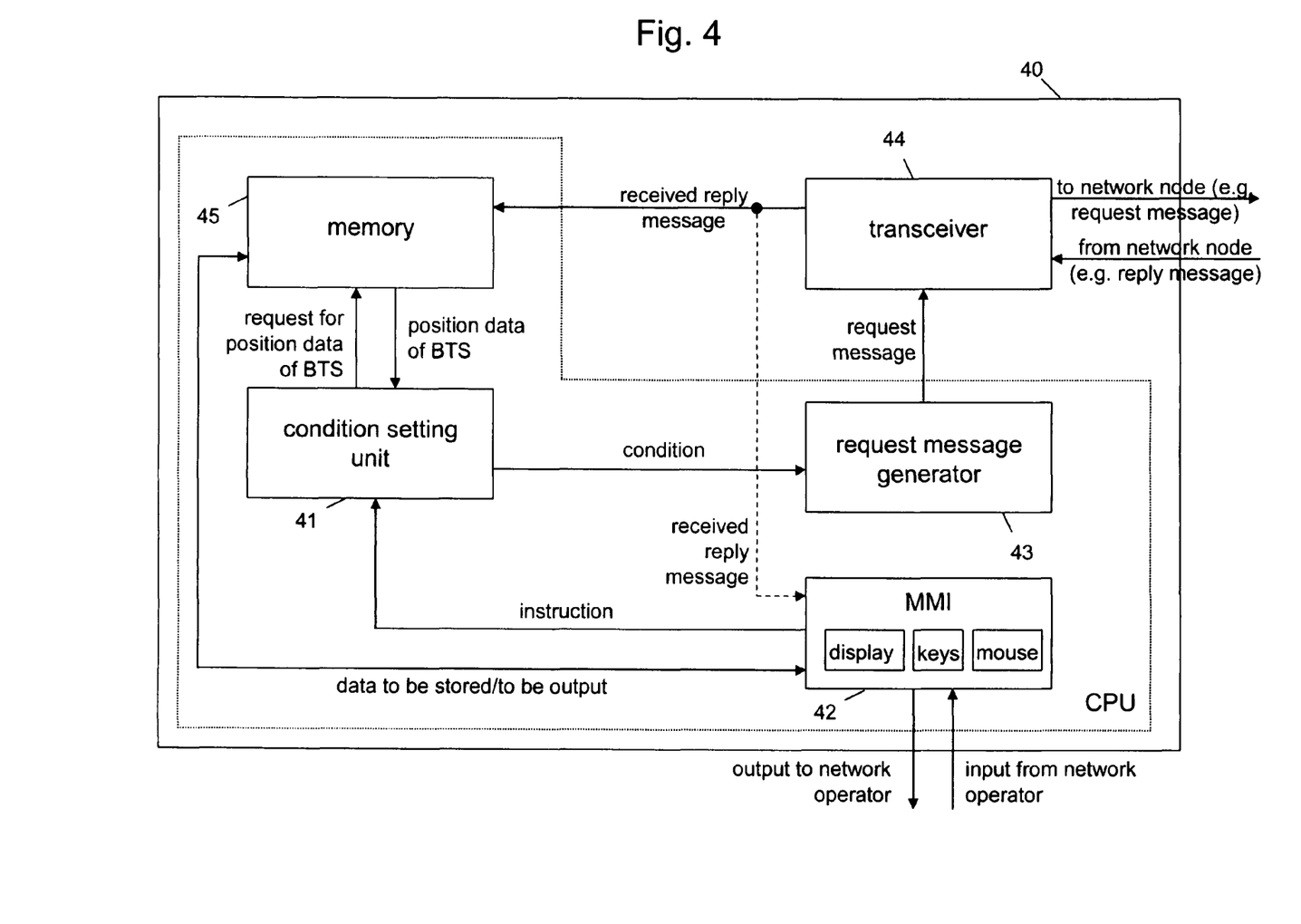
FIG. 4 is a block diagram of a managing node according to an embodiment of the present invention.

FIG. 4 is a block diagram of a managing node according to an embodiment of the present invention.

The managing node 40, like e.g. a network management system or the like, comprises a condition setting unit 41 that is capable of setting at least one condition to be satisfied by the network node. The condition can be set according to an instruction from a network operator that is received from a man-machine-interface MMI 42 connected to the condition setting unit 41. The MMI 42 generally comprises a display or the like for outputting information to the network operator, and keys, a mouse, a pen or the like with which the network operator can input information. As a condition it can be set that the network node is located within a certain area and/or that the network node is not yet commissioned. The condition setting unit 41 is further connected to a memory 45. The memory 45 may contain data about already commissioned network elements, like e.g. the position data and network protocol addresses of the network nodes BTS1 to BTS3 as shown in FIG. 1. Further, the memory 45 may contain position data of a newly installed network node, like e.g. network node BTS4 in FIG. 1, which have been stored in advance in the memory 45 after an input made by the network operator via the MMI 42. This position data can then be used for setting the condition, namely the condition that the network node is located within a certain area. This certain area can be specified for example by a geographical coordinate and a maximum distance from these coordinates. Further, this area may also be determined based on three or more coordinates wherein the connection between these coordinates defines a certain area. Thus, in case it has been set as the condition that the network node has to be located within a certain area, the condition setting unit 41 sends a request for the position data of the network node to the memory and then receives the position data of the network node. The condition setting unit 41 is further connected to a request message generator 43. The condition setting unit 41 forwards the condition to the request message generator 43 which generates a request message containing the condition set by the condition setting unit 41. The request message is then forwarded to a transceiver 44 connected to the request message generator 43 and the transceiver 44 transmits the request message to the network nodes, e.g. per broadcast. The transceiver 44 is further configured to receive a reply message from network nodes that satisfy the specified combination of conditions set in the request message and forwards the position data and network protocol address contained in the reply message to the memory 45, connected to the transceiver 44. In the memory 45, at least the position data and network protocol address are stored. Optional the memory can also store the configuration files for each network element to be downloaded for automatic remote commissioning. Optionally, the received reply message is forwarded to the MMI 42 and the MMI 42 displays the data contained in the reply message on the display. Furthermore, also data stored in the memory 45 can be output to the network operator via the MMI 42.

As a specific example only, a case will be described in the following where the request message and the reply message conform to Ethernet protocol as layer-2 protocol.

In the example as described below, the following abbreviations are used: ARP=Address Resolution Protocol; WGS84=World Geodetic System 1984; N=north; S=south; E=east; W=west.

A packet format in the Ethernet case would be as follows:

---

Packet Format Example (Ethernet case):
Ethernet header:
| | |
|---|---|
| 6 bytes: | Ethernet address of destination |
| 6 bytes: | Ethernet address of sender |
| 2 bytes: | Protocol type = LOCATION_BASED_ADDRESS_RESOLUTION (new EtherType to be specified) |

Ethernet packet data (payload):
| | | |
|---|---|---|
| 1 byte: | Operation Code (REQUEST = 1/REPLY = 2) | |
| 1 byte: | K = Number of conditions to be met in order to trigger REPLY message | |
| | $1^{st}$ Condition: | |
| | 1 byte: | Condition Type (to be specified) |
| | 1 byte: | U = Byte length of Condition |
| | U bytes: | Condition to be met by receiver |
| | ... | |
| | $K^{th}$ Condition: | |
| | 1 byte: | Condition Type (to be specified) |
| | 1 byte: | V = Byte length of Condition |
| | V bytes: | Condition to be met by receiver |
| 2 bytes: | Layer-2 Protocol Type (same values as e.g. in ARP, e.g. Ethernet = 1) | |
| 1 byte: | L = Byte length of Layer-2 Protocol Address | |
| L bytes: | Layer-2 Protocol Address of sender of this packet | |
| 2 bytes: | Network Protocol Type (EtherType) | |
| 1 byte: | M = Byte length of Network Protocol Address | |
| M bytes: | Network Protocol Address of sender of this packet | |
| 2 bytes: | Coordinate Format Type (to be specified) | |
| 1 byte: | N = Byte length of Coordinate Format | |
| N bytes: | Geographic Coordinates of sender of this packet (optional in REQUEST) | |

---

It is to be noted, however, that Ethernet protocol is only a specific example and that the present invention is not limited to Ethernet protocol as layer-2 protocol. Other layer-2 protocols with broadcast capability are also feasible. The Ethernet packet data would then be contained in the payload area of the other layer-2 protocol. By means of the layer-2 protocol, the network node is advertised to the managing node and then capable to communicate data with the managing node via a layer-3 protocol, like e.g. IP. However, it has to be noted that the present invention is not limited to IP as layer-3 protocol.

In the following, different scenarios of the specific example, i.e. the Ethernet case, are illustrated in order to describe possible implementations of embodiments of the present invention.

A first scenario of the specific example describes a case in which the managing node gets the network protocol address of a network node that is located at a specific location.

A managing node, e.g. a network management system decides to send data (e.g. a IP packet) to a network node (e.g. a base station), wherein the managing node and the network node belong to the same layer-2 network (e.g. Ethernet LAN or MAN). Here, the network node has already acquired a network protocol address (layer-3 address, e.g. IP address) by some means (e.g. DHCP). However, the managing node does not yet know the network protocol address of the network node. In order to be able to deliver data to the network node via a layer-3 protocol, the managing node must first find out the network protocol address of the network node. The managing node does however know the approximate geographic coordinate of the network node, since it was a result of network planning to deploy a base station at exactly this location. Thus, the managing node broadcasts (e.g. by means of an Ethernet broadcast frame) a request message which all other network nodes (e.g. all base stations) of the layer-2 network, that are to be managed by the managing node, receive. The message contains the geographic coordinate of the desired network node as well as a maximum distance from these coordinate. All network nodes can measure their geographic location (e.g. with GPS) and then all network nodes, which are located within the circular area described by the coordinate and the maximum distance, i.e. all network nodes that satisfy the condition, send back a reply message to the managing node. The reply messages contain the network protocol addresses and the position data of the respective network nodes. When the coordinates in the request message are sufficiently exact, and the maximum distance is reasonably chosen, only the desired network node will send a reply message. The managing node then knows the network protocol address of the network node and can deliver the data.

Example of a REQUEST Packet according to the first scenario of the specific example of the present invention:

---

Ethernet header:
  6 bytes: Ethernet address of destination = ETHERNET_BROADCAST_ADDRESS
  6 bytes: Ethernet address of sender = 0x01-02-03-04-05-06
  2 bytes: Protocol type = LOCATION_BASED_ADDRESS_RESOLUTION
Ethernet packet data (payload):
  1 byte: Operation Code = 1 (REQUEST)
  1 byte: 1 = Number of Conditions to be met in order to trigger REPLY message
    2 bytes: Condition Type = LOCATION_MATCH
    1 byte: 18 = Byte length of Location Match Condition
    18 bytes: Location Match Condition:
      2 bytes: Coordinate Format Type = 1 (proprietary format as follows)
      1 byte: 11 = Byte length of Coordinate Format
      11 bytes: Geographic Coordinates:
        1 byte: Map Datum = 1 (WGS84)
        10 bytes: Coordinates = 01 48 08 2650 02 11 34 7960
        Meaning:
        01 = N (N = 01, E = 02, S = 03, W = 04)
        48 = 48°
        08 2650 = 08.265'
        02 = E (N = 01, E = 02, S = 03, W = 04)
        11 = 11°
        34 7960 = 34.796'
    4 bytes: Requested Maximum Distance in mm = 100.000
  2 bytes: Layer-2 Protocol Type = 1 (ETHERNET, use numbers specified in e.g. ARP)
  1 byte: 6 = Byte length of Layer-2 Protocol Address
  6 bytes: Sender MAC address = 0x01-02-03-04-05-06
  2 bytes: Network Protocol Type = 0x0800 (IPv4)
  1 byte: 4 = Byte length of Network Protocol Address
  4 bytes: Sender IPv4 address = 1.2.3.4 (optional in REQUEST)
  2 bytes: Coordinate Format Type = 0 (proprietary format as follows, here: NULL)
  1 byte: 0 = Byte length of Coordinate Format (i.e. coordinates not included)

---

Example of a REPLY Packet according to the first scenario of the specific example of the present invention:

---

Ethernet header:
  6 bytes: Ethernet address of destination = 0x01-02-03-04-05-06
  6 bytes: Ethernet address of sender = 0x0A-0B-0C-0D-0E-0F
  2 bytes: Protocol type = LOCATION_BASED_ADDRESS_RESOLUTION
Ethernet packet data (payload):
  1 bytes: Operation Code = 2 (REPLY)
  1 byte: 1 = Number of Conditions to be met in order to trigger REPLY message
    2 bytes: Condition Type = LOCATION_MATCH
    1 byte: 18 = Byte length of Location Match Condition
    18 bytes: Location Match Condition:
      2 bytes: Coordinate Format Type = 1 (proprietary format as follows)
      1 byte: 11 = Byte length of Coordinate Format
      11 bytes: Geographic Coordinates:
        1 byte: Map Datum = 1 (WGS84)
        10 bytes: Coordinates = 01 48 08 2650 02 11 34 7960
        Meaning:
        01 = N (N = 01, E = 02, S = 03, W = 04)
        48 = 48°
        08 2650 = 08.265'
        02 = E (N = 01, E = 02, S = 03, W = 04)
        11 = 11°
        34 7960 = 34.796'
    4 bytes: Requested Maximum Distance in mm = 100.000
  2 bytes: Layer-2 Protocol Type = 1 (ETHERNET, use numbers specified in ARP)
  1 byte: 6 = Byte length of Layer-2 Protocol Address
  6 bytes: Sender MAC address = 0x0A-0B-0C-0D-0E-0F
  2 bytes: Network Protocol Type = 0x0800 (IPv4)
  1 byte: 4 = Byte length of Network Protocol Address
  4 bytes: Sender IPv4 address = 11.22.33.44 (mandatory in this example for the REPLY)
  2 bytes: Coordinate Format Type = 1 (proprietary format as follows)
  1 byte: 11 = Byte length of Coordinate Format
  11 bytes: Geographic Coordinates:
    1 byte: Map Datum = 1 (WGS84)
    10 bytes: Coordinates = 01 48 08 2655 02 11 34 7965
    Meaning:
    01 = N (N = 01, E = 02, S = 03, W = 04)
    48 = 48°

-continued

```
08 2655 = 08.2655'
02 = E (N = 01, E = 02, S = 03, W = 04)
11 = 11°
34 7965 = 34.7965'
```

The managing node could for example be a personal computer (PC), on which an element manager (EM) application is running. There could be a small dialogue window on the display, in which the network operator enters the destination coordinates and the maximum distance. When the network operator presses a key, the REQUEST message is generated. The IP address contained in the REPLY message is then displayed in the dialogue window. In case no REPLY or more than one REPLY is received, the network operator is prompted to modify the coordinates and the maximum distance.

In a more integrated EM application, the coordinates and the maximum distance could be directly used to address a certain network node. The network operator would not have to enter the IP address of the network node then. The EM would automatically resolve the coordinates and the maximum distance to an IP address, and this would be hidden from the network operator.

A second scenario of the specific example describes a case in which the managing node gets the network protocol addresses and location of all not commissioned network nodes that are to be managed by the managing node.

In the second scenario, a managing node is interested in all network nodes that are not yet commissioned. The network nodes know whether they are already commissioned or not (e.g. by analysing a flag, as described above). The managing node sends a broadcast packet to all network nodes, and all network nodes that are not yet commissioned reply to that broadcast message with a reply message containing the IP address and the position data. The managing node receives the reply messages and can create a list of not yet commissioned network nodes, identified by their IP addresses and their geographic coordinates. Based on the geographic coordinates, configuration files, e.g. network node specific and already prepared configuration files, may automatically be downloaded to the respective network nodes.

Example of a REQUEST Packet according to the second scenario of the specific example of the present invention:

```
Ethernet header:
    6 bytes:    Ethernet address of destination =
                ETHERNET_BROADCAST_ADDRESS
    6 bytes:    Ethernet address of sender = 0x01-02-03-04-05-06
    2 bytes:    Protocol type =
                LOCATION_BASED_ADDRESS_RESOLUTION
Ethernet packet data (payload):
    1 byte:     Operation Code = 1 (REQUEST)
    1 byte:     1 = Number of Conditions to be met in order to
                trigger REPLY message
    2 bytes:    Condition Type = NOT_COMMISSIONED
    1 byte:     0 = Byte length of Not-Commissioned Condition
    2 bytes:    Layer-2 Protocol Type = 1
                (ETHERNET, use numbers specified by ARP)
    1 byte:     6 = Byte length of Layer-2 Protocol Address
    6 bytes:    Sender MAC address = 0x01-02-03-04-05-06
    2 bytes:    Network Protocol Type = 0x0800 (IPv4)
    1 byte:     4 = Byte length of Network Protocol Address
    4 bytes:    Sender IPv4 address = 1.2.3.4 (optional in REQUEST)
    2 bytes:    Coordinate Format Type = 0
                (proprietary format as follows, here: NULL)
    1 byte:     0 = Byte length of Coordinate Format
                (i.e. coordinates not included)
```

Example of a REPLY Packet according to the second scenario of the specific example of the present invention (the managing node sending the request message might receive many of them):

```
Ethernet header:
    6 bytes:    Ethernet address of destination = 0x01-02-03-04-05-06
    6 bytes:    Ethernet address of sender = 0x0A-0B-0C-0D-0E-0F
    2 bytes:    Protocol type =
                LOCATION_BASED_ADDRESS_RESOLUTION
Ethernet packet data (payload):
    1 byte:     Operation Code = 2 (REPLY)
    1 byte:     1 = Number of Conditions to be met in order to trigger
                REPLY message
    2 bytes:    Condition Type = NOT_COMMISSIONED
    1 byte:     0 = Byte length of Not-Commissioned Condition
    2 bytes:    Layer-2 Protocol Type = 1 (ETHERNET, use numbers
                specified by ARP)
    1 byte:     6 = Byte length of Layer-2 Protocol Address
    6 bytes:    Sender MAC address = 0x0A-0B-0C-0D-0E-0F
    2 bytes:    Network Protocol Type = 0x0800 (IPv4)
    1 byte:     4 = Byte length of Network Protocol Address
    4 bytes:    Sender IPv4 address = 11.22.33.44
                (mandatory in this example for the REPLY)
    2 bytes:    Coordinate Format Type = 1
                (proprietary format as follows)
    1 byte:     11 = Byte length of Coordinate Format
    11 bytes:   Geographic Coordinates:
                1 byte:     Map Datum = 1 (WGS84)
                10 bytes:   Coordinates = 01 48 08 2655 02 11 34 7965
                            Meaning:
                            01 = N (N = 01, E = 02, S = 03, W = 04)
                            48 = 48°
                            08 2655 = 08.2655'
                            02 = E (N = 01, E = 02, S = 03, W = 04)
                            11 = 11°
                            34 7965 = 34.7965'
```

A third scenario illustrates a case in which a managing node gets the network protocol addresses and location of all not commissioned network nodes that are located within a certain area. Thus, the third scenario constitutes a combination of the first and the second scenario and therefore, a detailed explanation of this scenario will be omitted.

In the following an example of the structure of only the condition part of the REQUEST message is shown:

```
1 byte:     2 = Number of Conditions to be met in order to trigger
            REPLY message
2 bytes:    Condition Type = LOCATION_MATCH
1 byte:     18 = Byte length of Location Match Condition
18 bytes:   Location Match Condition:
            2 bytes:    Coordinate Format Type = 1
                        (proprietary format as follows)
            1 byte:     11 = Byte length of Coordinate Format
            11 bytes:   Geographic Coordinates:
                        1 byte:     Map Datum = 1 (WGS84)
                        10 bytes:   Coordinates = 01 48 08 2650 02
                                    11 34 7960
                                    Meaning:
                                    01 = N (N = 01, E = 02,
                                    S = 03, W = 04)
                                    48= 48°
                                    08 2650 = 08.265'
                                    02 = E (N = 01, E = 02,
                                    S = 03, W = 04)
                                    11 = 11°
                                    34 7960 = 34.796'
            4 bytes:    Requested Maximum Distance in
                        mm = 100.000
2 bytes:    Condition Type = NOT_COMMISSIONED
1 byte:     0 = Byte length of Not-Commissioned Condition
```

As already mentioned above, the packet formats described in the foregoing are only specific examples. It is to be noted that the present invention is applicable to many different layer-2 and layer-3 network types.

In a case where several layer-2 networks are connected by routers to build up a bigger layer-3 network, the solution according to the present invention for such a network has to take into account the routing mechanisms of the particular layer-3 network.

In case IP is used as the layer-3 protocol, the packets contain also an IP header and the address resolution application runs on top of IP and (probably) UDP (user datagram protocol), and not directly on the layer-2 protocol. In such a case, an IP multicast scheme could then be used and all network nodes would join a dedicated multicast group. The request messages would then be sent based on the multicast scheme.

According to the present invention, the goal of autoconfiguration of network nodes is to minimize the number of site visits. In a first step, the network node could automatically acquire an IP address by some mechanism such as e.g. DHCP. In a second step, the managing node could then find out the acquired IP address as described in the foregoing description.

In contrast to the IP address (which is a configurable integer value), the location of the network node is a fixed parameter, since it was a result of network planning to deploy a base station at exactly this location. A network node can estimate its geographic coordinates via some mechanism, e.g. a satellite-based positioning system as GPS or Galileo. These coordinates can then be linked to the acquired IP address.

In view of the foregoing description it will be evident to a person skilled in the art that various modifications may be made within the scope of the invention.

The invention claimed is:

1. A method, comprising:
    determining, at a network node, position data of the network node, wherein the network node is configured to wirelessly communicate with at least one mobile station;
    setting, at a managing node, at least one condition to be satisfied by the network node;
    transmitting, by the managing node, a request message containing the at least one condition;
    receiving, at the network node, the request message containing the at least one condition;
    evaluating, at the network node, the at least one condition contained in the request message;
    in response to the at least one condition being satisfied, replying, at the network node, with a reply message to the managing node containing at least an internet protocol address and the determined position data of the network node; and
    receiving at the managing node the reply message, wherein the request message is transmitted and received using a network implementing a second protocol and is addressed with an address applicable to the second protocol, wherein the reply message is replied to, received, and addressed using the second protocol over the network, wherein an internet protocol is different from the second protocol, wherein the network also implements the internet protocol, and wherein addresses for the internet protocol and the second protocol have different formats.

2. The method according to claim 1, wherein the setting further comprises defining a condition that the network node is located within a certain area.

3. The method according to claim 2, wherein the setting comprises defining a condition that the network node is not yet commissioned, wherein the network node is commissioned if the network node has been configured initially to perform according to its required operation in a network comprising the network node, the managing node, and the at least one mobile station.

4. The method according to claim 2, wherein the setting comprises determining the certain area, in which the network node is located, based on information related to the position of the network node that is stored in a memory of the managing node.

5. The method according to claim 1, wherein the setting comprises defining a condition that the network node is not yet commissioned, wherein the network node is commissioned if the network node has been configured initially to perform according to its required operation in a network comprising the network node, the managing node, and the at least one mobile station.

6. The method according to claim 1, wherein the transmitting comprises broadcasting the request message to all network nodes that are to be managed by the managing node.

7. The method according to claim 6, wherein receiving further comprises receiving at the managing node a plurality of reply messages from a plurality of the network nodes and creating a list of not yet commissioned network nodes, identified by their interne protocol address and position data, upon receipt of the reply messages.

8. The method according to claim 1, further comprising downloading configuration files from the managing node to the network node after receiving the reply message from the network node at the managing node.

9. The method according to claim 8, wherein the downloading to the network node is effected based on the received internet protocol address of the network node.

10. The method according to claim 1, further comprising acquiring, at the network node, the internet protocol address for the network node.

11. The method according to claim 10, wherein the acquiring comprises obtaining the interne protocol address by means of one of a dynamic host configuration protocol DHCP, IPv6 stateless autoconfiguration protocol or IP zero-configuration protocol.

12. The method according to claim 1, wherein the determining of the position data of the network node is made by means of a positioning system.

13. The method according to claim 12, wherein the positioning system is a satellite-based positioning system.

14. A network node, comprising:
    a transceiver configured to receive a request message from a managing node containing at least one condition set by the managing node and the network node comprising a base station configured to wirelessly communicate with at least one mobile station;
    at least one processor;
    at least one memory comprising processor implementable instructions;
    the at least one memory and the processor implementable instructions configured to, with the at least one processor, cause the network node to perform:
        determine position data of the network node;
        evaluate the at least one condition set in the request message from the managing node; and
        in response to the at least one condition being satisfied, generate a reply message containing at least an interne protocol address and the determined position data of the network node and forward the reply message to the transceiver; and the transceiver being further configured to transmit the reply message to the managing node, wherein the request message is received using a network implementing a second protocol and is addressed with an address applicable to the second protocol, wherein the reply message is transmitted and addressed using the second protocol over the network, wherein an Internet protocol is different from the second protocol, wherein the network also implements the internet protocol, and wherein addresses for the internet protocol and the second protocol have different formats.

15. The network node according to claim 14, wherein the at least one memory and the processor implementable instructions are further configured to, with the at least one processor, cause the network node to: evaluate whether the determined position as indicated by the determined position data is located within a certain area defined in the received request message and to evaluate the at least one condition based on the evaluation of whether the determined area is within the certain area.

16. The network node according to claim 14, wherein the at least one memory and the processor implementable instructions are further configured to, with the at least one processor, to cause the network node:
evaluate whether the network node is commissioned, wherein the network node is commissioned if the network node has been configured initially to perform according to its required operation in a network comprising the network node, the managing node, and the at least one mobile station; and
evaluate the at least one condition based on the evaluation of whether the node is commissioned.

17. The network node according to claim 16, wherein to evaluate whether the network node is commissioned further comprises to evaluate whether the network node is commissioned by means of a flag, wherein the flag is set to a predetermined value and the flag is set to a value different from the predetermined value after the network node has been commissioned.

18. The network node according to claim 14, wherein the at least one processor comprises a receiver of a positioning system, the receiver configured to determine the position data.

19. The network node according to claim 14, wherein the at least one memory and the processor implementable instructions are further configured to, with the at least one processor, to cause the network node: in response to the at least one condition not being satisfied, to not generate or forward the reply.

20. The network node according to claim 14, wherein:
the second protocol is a layer-2 protocol; and
the Internet protocol is a layer-3 protocol.

21. The network node according to claim 20, wherein:
the second protocol is an Ethernet protocol and the request message is a broadcast message.

22. A managing node comprising:
at least one processor;
at least one memory comprising processor implementable instructions;
the at least one memory and the processor implementable instructions configured to, with the at least one processor, cause the managing node to perform:
set at least one condition to be satisfied by a network node, wherein the network node comprises a base station configured to wirelessly communicate with at least one mobile station; and
generate a request message containing the at least one condition; and
a transceiver configured to transmit the request message containing the at least one condition to a network node,
the transceiver being further configured to receive a reply message from the network node, the reply message indicating the network node satisfies the at least one condition and comprising at least an internet protocol address of the network node and position data of the network node, wherein the request message is transmitted using a network implementing a second protocol and is addressed with an address applicable to the second protocol, wherein the reply message is received and addressed using the second protocol over the network, wherein an internet protocol is different from the second protocol, wherein the network also implements the internet protocol, and wherein addresses for the internet protocol and the second protocol have different formats.

23. The managing node according to claim 22, wherein the at least one memory and the processor implementable instructions are further configured to, with the at least one processor, cause the managing node to: define a condition that the network node is located within a certain area.

24. The managing node according to claim 22, wherein the at least one memory and the processor implementable instructions are further configured to, with the at least one processor. cause the managing node to: define a condition that the network node is not yet commissioned, wherein the network node is commissioned if the network node has been configured initially to perform according to its required operation in a network comprising the network node, the managing node, and the at least one mobile station.

25. The managing node according to claim 22, wherein the memory is further configured to store in advance position data of the network node.

26. The managing node according to claim 22, wherein the memory is further configured to store in advance configuration files.

27. The managing node according to claim 26, further configured to automatically download the configuration files to the network node after receiving the reply message from the network node.

28. The managing node according to claim 22, further comprising input devices configured to input instructions from a network operator, and a display configured to display the position data and interne protocol address received from the network node and other data stored in the memory.

29. The managing node according to claim 22, wherein the at least one memory and the processor implementable instructions are further configured to, with the at least one processor, cause the managing node to: set the at least one condition to be satisfied for a plurality of network nodes, wherein the transceiver is further configured to transmit the request message to the plurality of network nodes, and wherein the managing node receives reply messages from network nodes satisfying the at least one condition and does not receive reply messages from network nodes not satisfying the at least one condition.

30. The managing node according to claim 22, wherein:
the second protocol is a layer-2 protocol; and
the interne protocol is a layer-3 protocol.

31. The managing node according to claim 30, wherein:
the second protocol is an Ethernet protocol and the request message is a broadcast message.

32. A method, comprising:
receiving, at a network node, a request message from a managing node containing at least one condition set by the managing node, wherein the network node comprises a base station configured to wirelessly communicate with at least one mobile station;

determining position data of the network node;

evaluating, at the network node, the at least one condition set in the request message from the managing node;

in response to the at least one condition being satisfied, creating, at the network node, a reply message comprising at least an interne protocol address and the determined position data of the network node, and transmitting the reply message from the network node to the managing node, wherein the request message is received using a network implementing a second protocol and is addressed with an address applicable to the second protocol, wherein the reply message is transmitted and addressed using the second protocol over the network, wherein an internet protocol is different from the second protocol, wherein the network also implements the internet protocol, and wherein addresses for the interne, protocol and the second protocol have different formats.

33. A method, comprising:

setting at least one condition to be satisfied by a network node, wherein the network node comprises a base station configured to wirelessly communicate with at least one mobile station;

generating a request message containing the at least one condition;

transmitting the request message containing the at least one condition to a network node; and receiving a reply message from the network node, the reply message indicating the network node satisfies the at least one condition and comprising at least an interne protocol address and position data of the network node, wherein the request message is transmitted using a network implementing a second protocol and is addressed with an address applicable to the second protocol, wherein the reply message is received and addressed using the second protocol over the network, wherein an interne, protocol is different from the second protocol, wherein the network also implements the interne, protocol, and wherein addresses for the interne, protocol and the second protocol have different formats.

34. A computer program product comprising processor implementable instructions stored as software code portions on a non-transitory computer-readable medium loadable into an internal memory of a computer, the execution of the computer program resulting in performance of operations comprising:

receiving, at a network node, a request message from a managing node containing at least one condition set by the managing node, wherein the network node comprises a base station configured to wirelessly communicate with at least one mobile station;

determining position data of the network node;

evaluating, at the network node, the at least one condition set in the request message from the managing node;

in response to the at least one condition being satisfied, creating, at the network node, a reply message comprising at least an internet protocol address and the determined position data of the network node, and transmitting the reply message from the network node to the managing node, wherein the request message is received using a network implementing a second protocol and is addressed with an address applicable to the second protocol, wherein the reply message is transmitted and addressed using the second protocol over the network, wherein an internet protocol is different from the second protocol, wherein the network also implements the internet protocol, and wherein addresses for the internet protocol and the second protocol have different formats.

35. A computer program product comprising processor implementable instructions stored as software code portions on a non-transitory computer-readable medium loadable into an internal memory of a computer, the execution of the computer program resulting in performance of operations comprising:

setting at least one condition to be satisfied by a network node, wherein the network node comprises a base station configured to wirelessly communicate with at least one mobile station;

generating a request message containing the at least one condition;

transmitting the request message containing the at least one condition to a network node; and receiving a reply message from the network node, the reply message indicating the network node satisfies the at least one condition and comprising at least an interne protocol address and position data of the network node, wherein the request message is transmitted using a network implementing a second protocol and is addressed with an address applicable to the second protocol, wherein the reply message is received and addressed using the second protocol over the network, wherein an interne protocol is different from the second protocol, wherein the network also implements the Internet protocol, and wherein addresses for the interne protocol and the second protocol have different formats.

\* \* \* \* \*

UNITED STATES PATENT AND TRADEMARK OFFICE
CERTIFICATE OF CORRECTION

PATENT NO.         : 8,144,607 B2
APPLICATION NO.    : 11/634944
DATED              : March 27, 2012
INVENTOR(S)        : Hauenstein et al.

It is certified that error appears in the above-identified patent and that said Letters Patent is hereby corrected as shown below:

Claim 7, col. 16, line 26 delete "interne" and insert --internet--.

Claim 11, col. 16, line 39 delete "interne" and insert --internet--.

Claim 14, col. 16, line 64 delete "interne" and insert --internet--.

Claim 24, col. 18, line 27 delete "." in between processor and cause.

Claim 28, col. 18, line 46 delete "interne" and insert --internet--.

Claim 30, col. 18, line 61 delete "interne" and insert --internet--.

Claim 32, col. 19, line 9 delete "interne" and insert --internet--.

Claim 32, col. 19, line 20 delete "interne" and insert --internet--.

Claim 33, col. 19, line 33 delete "interne" and insert --internet--.

Claim 33, col. 19, line 39 delete "interne," and insert --internet--.

Claim 33, col. 19, line 41 delete "interne," and insert --internet--.

Claim 33, col. 19, line 42 delete "interne," and insert --internet--.

Claim 35, col. 20, line 38 delete "interne" and insert --internet--.

Claim 35, col. 20, line 44 delete "interne" and insert --internet--.

Claim 35, col. 20, line 47 delete "interne" and insert --internet--.

Signed and Sealed this
Twelfth Day of June, 2012

David J. Kappos
*Director of the United States Patent and Trademark Office*